United States Patent [19]

Inoue et al.

[11] Patent Number: 4,875,264

[45] Date of Patent: Oct. 24, 1989

[54] METHOD FOR PRODUCING DIES FOR EXTRUDING HONEYCOMB STRUCTURES

[75] Inventors: Satoru Inoue, Aichi; Shoji Futamura, Kawasaki, both of Japan

[73] Assignees: NGK Insulators, Ltd.; Hoden Seimitsu, both of Nagoya, Japan

[21] Appl. No.: 316,641

[22] Filed: Feb. 28, 1989

Related U.S. Application Data

[62] Division of Ser. No. 84,027, Aug. 11, 1987, Pat. No. 4,830,598.

[30] Foreign Application Priority Data

Aug. 14, 1986 [JP] Japan .................................. 61-190744

[51] Int. Cl.$^4$ ............................................. B23P 9/00
[52] U.S. Cl. ................................... 29/163.6; 29/447; 228/170; 228/174
[58] Field of Search .................. 228/170, 174, 185; 29/163.6, 447

[56] References Cited

U.S. PATENT DOCUMENTS

| | | | |
|---|---|---|---|
| 3,284,176 | 11/1966 | Reed et al. ........................ | 228/174 X |
| 3,790,654 | 2/1974 | Bagley ............................. | 425/382 R |
| 4,354,820 | 10/1982 | Yamamoto et al. ................ | 29/163.6 |
| 4,373,895 | 2/1983 | Yamamoto et al. ................ | 29/163.6 |
| 4,378,964 | 4/1983 | Wolfe, Jr. ........................ | 425/463 |
| 4,653,996 | 3/1987 | Ozaki et al. ...................... | 228/203 |

FOREIGN PATENT DOCUMENTS 2480665 10/1981 France .

*Primary Examiner*—Kenneth J. Ramsey
*Attorney, Agent, or Firm*—Arnold, White & Durkee

[57] ABSTRACT

Dies for extruding honeycomb structures are disclosed, which comprise wear resistant alloy plates, a die base body having a coefficient of thermal expansion different from that of the wear resistant alloy plates, forming channels having a sectional shape conforming to that of honeycomb structural bodies to be extruded and a given depth from a front face of the die toward a rear face thereof, and a plurality of opening holes independently formed from the die near face toward the die front face and communicating with the forming channels. The die base body and the wear resistant alloy plates are bonded together such that the forming channels may communicate with the opening holes. A method for producing such dies is also disclosed, which is characterized in that slits are preliminarily formed in one of machined faces of the die base before the wear resistive alloy plates are bonded to the die base portion, and are located at a predetermined width in an arrangement conforming to the forming channels.

8 Claims, 3 Drawing Sheets

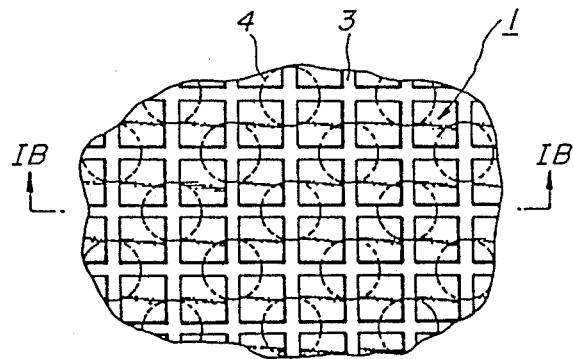
FIG_1A PRIOR ART
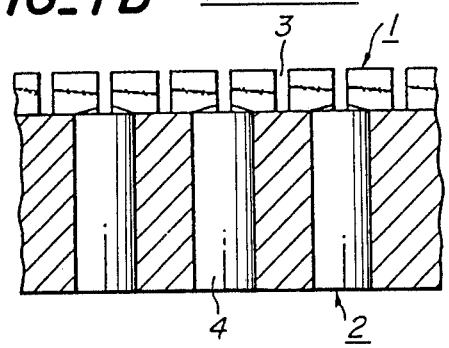
FIG_1B PRIOR ART
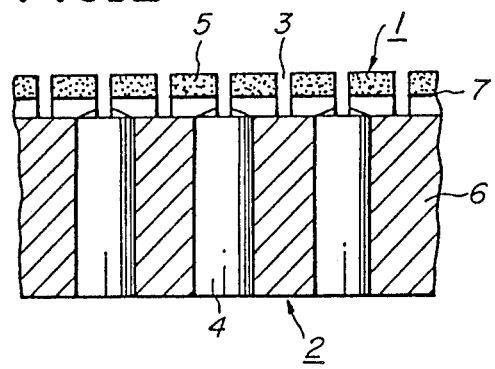
FIG_2 PRIOR ART

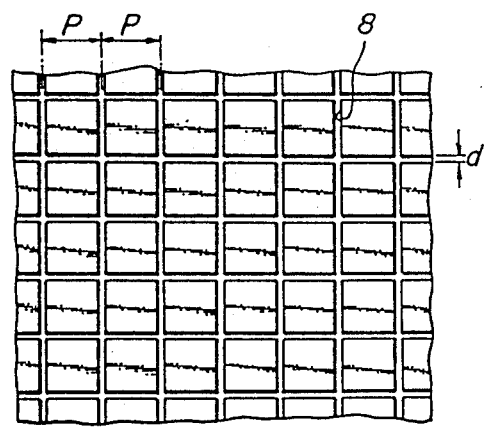
FIG_3A
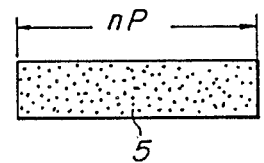
FIG_3B
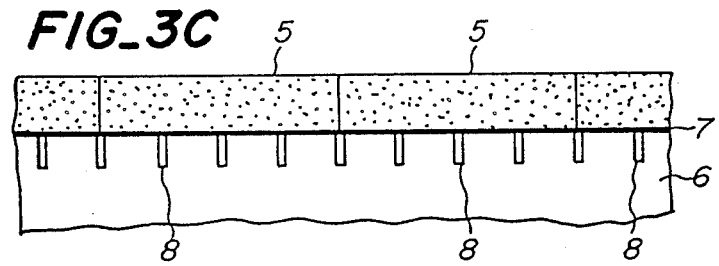
FIG_3C
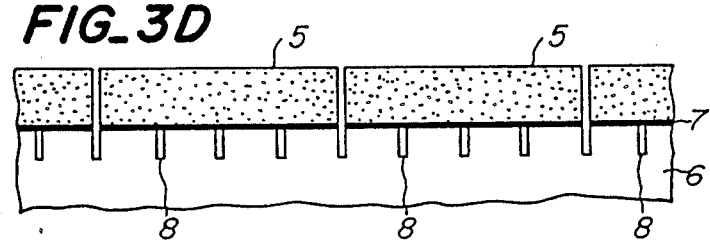
FIG_3D
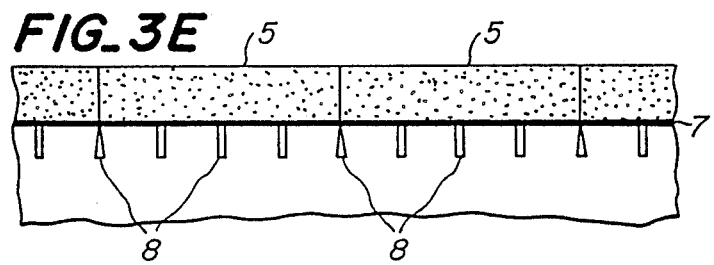
FIG_3E

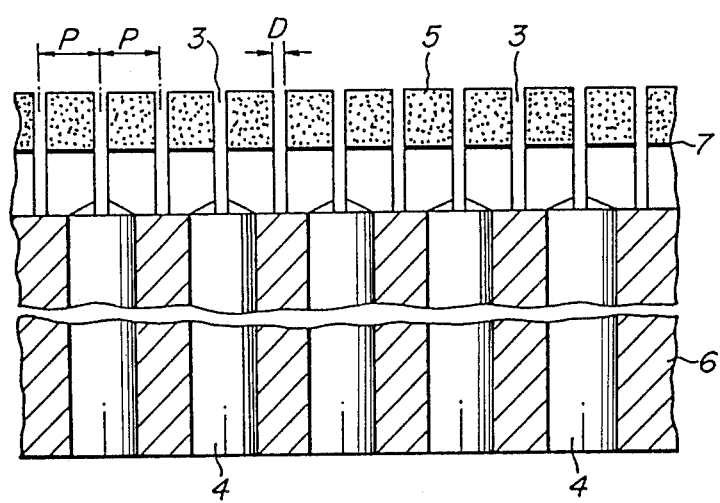
FIG_4

METHOD FOR PRODUCING DIES FOR EXTRUDING HONEYCOMB STRUCTURES

This is a division of application Ser. No. 084,027 filed Aug. 11, 1987, now U.S. Pat. No. 4,830,598.

BACKGROUND OF THE INVENTION (1) Field of the Invention:

The present invention relates to dies for extruding honeycomb structures and a method for producing the same. More particularly, the invention relates to dies for forming honeycomb structural bodies through extruding a plastic material such as a ceramic material, wherein wear resistive alloy plates (for instance, a super hard alloy plates) are bonded, through a liquid phase diffusion welding technique, to a die base body provided with a plurality of opening holes through which the plastic material is press fed, and forming channels are provided in the wear resistive alloy plate to communicate with the opening holes. The invention also relates to a process for manufacturing such dies. (2) Related Art Statement:

As pointed out by the prior art in U.S. Pat. No. 3,790,654, there has been known a honeycomb structure forming die as shown in FIG. 1 [FIG. 1(A) is a plan view of the honeycomb structure forming die, and FIG. 1(B) is a sectional side view of the die shown in FIG. 1(A) as viewed from an arrow ( B- B)]. More particularly, the honeycomb structure forming die shown in FIGS. 1(A) and (B) is of a so-called integral structure, and is provided with honeycomb structure forming channels 3 (hereinafter referred to briefly as "forming channels") extending from a front face 1 of the die toward a rear face 2 thereof in a specified depth and in a sectional shape conforming to that of honeycomb structural bodies to be formed (in the example shown in FIG. 1, a square shape). The die is also provided with a plurality of opening holes 4 which are independently bored from the die rear face 2 toward the die front face 1 and communicate with the forming channels 3. A raw material of the honeycomb structural bodies to be formed, for instance, a ceramic plastic material is press fed to all the above plural opening holes 4, and the press fed plastic material flows into the forming channels 3 while being squeezed. Then, the plastic material is continuously extruded into ceramic honeycomb structural bodies through the forming channels 3.

However, when honeycomb structural bodies are extruded by using such a conventional honeycomb structural die, the forming channels 3 are worn with the plastic material passing through the forming channels 3, thus resulting in an increase in the width of the channels. Thus, this poses a problem that expensive dies must be repeatedly exchanged so as to always assure a dimensional precision of the honeycomb structural bodies. In particular, when honeycomb structural bodies are to be formed through extrusion by using an alumina base material, a silicon carbide base material, a mullite base material, etc. having high hardness, the forming channels 3 are extensively worn. Therefore, there is an undesirable problem that the life of the die becomes conspicuously shorter.

Under the circumstances, in order to solve the above-mentioned undesirable problems, the U.S. prior art Pat. No. 4,653,996 discloses dies for extruding honeycomb structural body as shown in FIG. 2 in which a super hard alloy plate 5 is bonded to a front face of the die 1 and forming channels 3 are formed in the super hard alloy plate 5. In order to strengthen a bonded state between the super hard alloy plate 5 and the die base body 6, a well known liquid phase diffusion welding is used as a technique for bonding the super hard alloy plate 5 and the die base body 6. However, since the above liquid phase diffusion welding is carried out at high temperatures (for instance, at 1,000° C.), coefficients of thermal expansion of the super hard alloy plate 5 and the die base body 6 become a problem when the liquid phase diffusion welding is employed for the bonding. That is, when there exists a large difference in the coefficient of thermal expansion between them, the super hard alloy plate is warped or voids are formed in the bonding member 7 when the bonded super hard alloy plate and die base body are cooled to room temperature after the bonding. Consequently, after the forming channels 3 are formed in a slit manner, the slit super hard alloy plate 5 is likely to peel. For this reason, the die base plate 6 is made of an alloy steel such as Invar having a coefficient of thermal expansion substantially equal to that of the above super hard alloy plate 5. Thus, this poses a problem that the manufacturing cost becomes higher.

SUMMARY OF THE INVENTION

It is an object of the present invention to solve the above-mentioned problems, and to provide a die for extruding honeycomb structures and a method for producing said die. The honeycomb structure forming die of the present invention is characterized in that a wear resistant alloy plate is provided with forming channels having a sectional shape conforming to that of honeycomb structural bodies to be formed, and is bonded to a die base body provided with a plurality of opening holes to communicate with the forming channels in the wear resistant alloy plates and that the die base body is constituted with an ordinary steel. The method for producing the honeycomb structure forming dies according to the present invention is characterized in that after slits are preliminarily formed on a bonding surface of the die base body to which the wear resistive alloy plates are to be bonded, and the wear resistive plates are bonded thereto, whereby strains due to thermal expansion caused by difference in the coefficient of thermal expansion between the wear resistive alloy plates and the die base body can be mitigated.

These and other objects, features and advantages of the present invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1A, 1B and 2 are views of illustrating conventional honeycomb structure forming dies;

FIGS. 3(A) through (E) are views illustrating an example of the method for producing the honeycomb structure forming die according to the prevent invention; and FIG. 4 is a sectional view of the honeycomb structure forming die according to the present invention produced by the process illustrated in FIGS. 3(A) through (E).

DETAILED DESCRIPTION OF THE INVENTION

FIGS. 3(A) through (E) are views illustrating an embodiment of a method for producing the honeycomb structure forming dies according to the present invention. FIG. 4 is a sectional view of the honeycomb structure forming die according to the present invention by the process illustrated in FIGS. 3(A) through (E).

As shown in FIG. 4, the honeycomb structure forming die according to the present invention fundamentally has a construction similar to that of FIG. 2 as explained in the beginning of the specification. However, while the die base body 6 in the embodiment of FIG. 2 is constituted by an alloy steel such as Invar having a coefficient of thermal expansion substantially equal to that of the super hard alloy plate 5, in the embodiment according to the present invention illustrated in FIG. 4, the die base body 6 is formed by an inexpensive and easily available ordinary steel. As a matter of course, there exists a large difference in the coefficient of thermal expansion between the ordinary steel and the super hard alloy. Thus, if the dies are produced by the same method as illustrated in FIG. 2, undesirable problems caused due to a difference in the coefficient of thermal expansion as explained in the beginning of the specification cannot be solved. However, undesirable problems that the super hard alloy plate is peeled off due to the above difference in coefficient of thermal expansion can be solved by the method according to the present invention. In the following, the method according to the present invention will be explained in connection with FIGS. 3(A) through (E) and FIG. 4.

(i) First, a plain carbon steel is subjected to machining steps of cutting, grinding, polishing, etc. to form a die base body 6 having a desired shape (not shown).

(ii) Slits 8 as shown in FIG. 3(A) are formed by slitting a surface of the die base body 6 by means of electric spark machine or cutting tool. A pitch P of the slits 8 is the same dimension as those of forming channels 3 (shown in FIG. 4) to be machined. The width "d" of the slits is designed at not more than around $\frac{1}{2}$ of that D of the forming channels 3 (see FIG. 4). The depth is about ten times of the width of the slits.

(iii) Next, as shown in FIG. 3(B), a plurality of super hard alloy plates 5 having a given thickness (for instance, about 5 mm) and a given size (a length of a side of the super hard alloy plate being integer times the pitch P) are prepared.

(iv) The super hard alloy plates 5 prepared in the above step (iii) are bonded to the die base body 6 by a liquid base diffusion welding technique as follows:

(iv-1) As shown in FIG. 3(C), the super hard alloy plates 5 are placed onto the die base body 6 through a bonding member 7 made of a sheet (for instance, form 0.01 to 0.02 mm thick) of nickel, silver tungsten, silver, copper or the like. The super hard alloy plates 5 are mounted such that side faces of the super hard alloy plates 5 may be adapted to align with the slits.

(iv-2) Next, the super hard alloy plates 5 and the die base body 6 are bonded via the bonding member 7 through the liquid phase diffusion welding under vacuum at high temperatures (about 1,000° C.).

FIG. 3(D) shows a state when the super hard alloy plates are bonded to the die base plate via the bonding material. That is, since the temperature is high at the time of the bonding and the coefficient of thermal expansion of the die base body 6 is larger than that of the super hard alloy plates 5, gaps are formed between the super hard alloy plates 5. Since the groove width ("d" in FIG. 3(A)) of the slits is set corresponding to the size of the super hard alloy plates 5 ("nP" in FIG. 3(B)), this does not influence upon the formation of the forming channels 3 mentioned later (FIG. 4).

(v) After the bonding is performed by the above liquid phase diffusion welding, the temperature is left to cool to room temperature. This state is shown in FIG. 3(E). That is, influences due to expansion and contraction are absorbed by the slits 8 present at locations corresponding to those of the adjacent super hard alloy plates 5 as shown in FIG. 3(E).

(vi) Next, the forming channels as shown in FIG. 4 are worked by, for instance, a well known discharge electrical machining. Since locations at which the super hard alloy plates 5 adjoin together and locations of the slits 8 are in conformity with those of the forming channels 3 to be formed as mentioned in the foregoing, the super hard alloy plate-adjoining locations and the slits 8 are included in the channel width zones of the forming channels 3. Since the super hard alloy plates 5 and the joined portion of the bonding member 7 are finely divided by forming the forming channels 3, undesirable influences due to difference in the coefficient of thermal expansion between the super hard alloy plates 5 and the die base body 6 can be mitigated to a substantially ignorable degree.

The opening holes 4, 4, ... shown in FIG. 4 may be formed when the die base body 6 is formed in the above step (i) or may be formed after the forming channels 3 shown in FIG. 4 are machined.

As mentioned in the foregoing, according to the present invention, since the slits for mitigating thermal expansion strain are preliminarily formed in the die base body to which the super hard alloy plates to be provided with the forming channels is bonded, inexpensive and easily available plain carbon steel may be selected as a material of the die base body. The present invention can provide dies for extruding honeycomb structures and a method for producing the dies, which can afford prolonged use life and reduce production costs.

What is claimed is:

1. A method of producing honeycomb structural forming dies comprising:

providing a steel base body having a first coefficient of thermal expansion, a first surface and a second surface;

machining said body to form a desired shape;

forming a matrix of preliminary slits in said first surface and perpendicular thereto such that said matrix substantially corresponds to that of a honeycomb structure subsequently formed from said die;

providing a plurality of wear-resistant super hard alloy plates having a second coefficient of thermal expansion which is different from said first coefficient of thermal expansion, said plates having a given size and four side edge faces;

placing a bonding layer on said first surface of said steel die base body;

placing said plates on said bonding layer;

bonding said plates to said steel die base body, via the bonding layer, to form a bonded article, said bonding being performed by a high temperature welding technique, whereby a plurality of gaps are formed between said super hard alloy plates due to the different in coefficients of thermal expansion between said steel die base body and said plates;

cooling the bonded article to room temperature, whereby a portion of said preliminary slits are dimensionally altered so as to facilitate an expansion and contraction of said bonded article due to the different coefficients of thermal expansion between said steel die base body and said wear-resistant super hard alloy plates;

forming a matrix of forming channels in said bonded article perpendicular to said first surface, said matrix of forming channels being formed through said wear-resistant super hard alloy plates and said bonding layer, into the matrix of said preliminary slits in said steel die base body to form a final matrix in said bonded article; and forming opening holes in said second surface of said steel die base body and perpendicular thereto to result in a honeycomb structure forming die, said opening holes communicating with said forming channels of said final matrix;

whereby said honeycomb structure forming die is substantially free of any internal strain due to the different coefficients of thermal expansion between the steel die base body and the wear-resistant super hard alloy plates.

2. A method according to claim 1, wherein said plurality of wear-resistant super hard alloy plates are placed on said bonding layer such that the side edge faces of said plates are substantially aligned with a portion of said preliminary slits.

3. A method according to claim 1, wherein said first coefficient of thermal expansion is larger than said second coefficient of thermal expansion.

4. A method according to claim 1, wherein said preliminary slits have a width which is not greater than about one half of the width of said forming channels in said final matrix.

5. A method according to claim 4, wherein the preliminary slits are formed in the steel die base body to a depth which is about ten times the width of said preliminary slits.

6. A method according to claim 1, wherein said given size of said wear-resistant super hard alloy plates is equal to an integer times a distance between the center lines of two adjacent parallel forming channels in said final matrix.

7. A method according to claim 1, wherein said preliminary slits and said forming channels are formed by at least one machining technique selected from the group consisting of grinding, cutting and electrical discharge machining.

8. A method according to claim 1, wherein said high temperature welding technique includes liquid phase diffusion welding under a vacuum at a temperature of about 1,000° C.

* * * * *